United States Patent [19]

Boonstra et al.

[11] Patent Number: 5,688,896
[45] Date of Patent: Nov. 18, 1997

[54] NON-LINEAR OPTICALLY ACTIVE POLYCARBONATE

[75] Inventors: Tjerk Oedse Boonstra, Duiven; Ulfert Elle Wiersum, Velp, both of Netherlands

[73] Assignee: Akzo Nobel N.V., Arnhem, Netherlands

[21] Appl. No.: 604,691

[22] Filed: Feb. 21, 1996

Related U.S. Application Data

[63] Continuation-in-part of Ser. No. 312,254, Sep. 26, 1994, Pat. No. 5,588,083.

[51] Int. Cl.$^6$ .................................................. C08G 64/00
[52] U.S. Cl. ...................... 528/196; 385/145; 428/1; 525/461; 525/462; 525/463; 525/464; 525/465; 525/467; 525/468; 528/196; 528/198; 528/199; 528/201
[58] Field of Search ...................... 528/201, 196, 528/198, 199; 428/1; 525/461, 462, 463, 464, 465, 467, 468; 385/145

[56] References Cited

U.S. PATENT DOCUMENTS

| | | | |
|---|---|---|---|
| 4,859,876 | 8/1989 | Dirk et al. | 307/425 |
| 5,208,299 | 5/1993 | Bales et al. | 525/437 |

FOREIGN PATENT DOCUMENTS

| | | | |
|---|---|---|---|
| 194747 | 9/1986 | European Pat. Off. | G11B 7/24 |
| 297530 | 1/1989 | European Pat. Off. | C08G 63/68 |
| 350112 | 1/1990 | European Pat. Off. | C08G 18/67 |
| 358476 | 3/1990 | European Pat. Off. | G03F 7/00 |
| 363237 | 4/1990 | European Pat. Off. | G02F 1/35 |
| 403132 | 12/1990 | European Pat. Off. | C08G 18/38 |
| 464795 | 1/1992 | European Pat. Off. | G02F 1/35 |
| 493716 | 7/1992 | European Pat. Off. | C07D 333/22 |
| 571271 | 11/1993 | European Pat. Off. | G02F 1/35 |
| 2657083 | 7/1991 | France | C08G 63/685 |
| 94/01480 | 1/1994 | WIPO | C08G 18/67 |

OTHER PUBLICATIONS

T. Hoekstra al., "Photoluminescence and Attenuation of Spray–Pyrolysis–Deposited Erbium–Doped $Y_2O_3$ Planar Optical Waveguides", Optics Letters, vol. 17, No. 21 (1992), pp. 1506–1508.
Chemical Abstracts, vol. 113, 192148g (1990).
Derwent Patent Abstract 88–311005/44, abstracting JP 63/228,135 (Sep. 22, 1988).
Kirk–Othmer Encyclopedia of Chemical Technology, Third Edition, vol. 18, pp. 491–492.
Encyclopedia of Polymer Science and Engineering, John Wiley & Sons, vol. 11, pp. 680, 683–687.
Comp. Poly. Sci.: The Synthesis, Characterization, Reactions and Applications of Polymers, vol. 5, Chapter 20, pp. 345–356.
Angew. Makromol. Chem. (1990), 183: pp. 251–252.

*Primary Examiner*—Terressa Mosley
*Attorney, Agent, or Firm*—Richard P. Fennelly; Louis A. Morris

[57] ABSTRACT

The invention pertains to a non-linear optically active (NLO) side chain polycarbonate and to NLO active waveguides containing said polycarbonate. Waveguides containing this NLO polycarbonate have a low loss of signal. Polycarbonates based on bischloroformates of hexafluorobisphenol A, hexafluorotetrabromobisphenol A and bisphenol S or deuterated bisphenol A or sulphonylbiphenol are especially preferred within the framework of the invention: they were found to give an exceptionally low loss of signal. The invention further pertains to cross-linkable and already cross-linked polycarbonates. Especially preferred polycarbonates according to the invention are those where the diol comprises a rigid donor group. These polycarbonates have a high Tg, which renders them thermally stable.

10 Claims, No Drawings

NON-LINEAR OPTICALLY ACTIVE POLYCARBONATE

This application is a continuation-in-part of U.S. Ser. No. 08/312,254, filed Sep. 26, 1994, now U.S. Pat. No. 5,588,083, which claimed priority from Netherlands Patent Application No. 9301679, filed Sep. 29, 1993.

BACKGROUND OF THE PRIOR ART

The invention relates to a non-linear optically active (NLO) side chain condensation polymer. For a description of such a polymer reference may be had to U.S. Pat. No. 5,001,209. In said document polyurethanes are described which have been produced by the condensation polymerisation of diols having pendant NLO groups and diisocyanates. Generally, NLO groups are composed of a delocalised π system connected on one side to an electron donating group, i.e. a donor group, and on the other to an electron withdrawing group, i.e. an acceptor group. The term "Donor-π-Acceptor (DπA) group" is also used. When polymeric non-linear optically active material, i.e. polymeric material containing DπA groups, is poled, non-linear polarisation occurs under the influence of an external field of force (such as an electric field of force). Non-linear electric polarisation may give rise to a number of optically non-linear phenomena, including frequency doubling and Pockels effect. By utilising these phenomena it is possible to employ this material in the form of a poled film in optically active waveguiding components such as optical switches, frequency doublers, etc., in short, in active optical waveguides.

Although they display a high degree of NLO behaviour, the above-mentioned polymers are not optimally suited to be used in active optical waveguide components.

The main drawback to the above-described and other known active polymeric waveguides is their loss of signal. In the wavelength area for optical uses (1300–1600 nm) the known polymeric waveguides suffer major losses of signal.

Another drawback to the above-described and other known active polymeric waveguides is the fact that the polability still leaves much to be desired. Frequently, during poling only part of the DπA groups is aligned which results in a low initial Pockels coefficent ($r_{33}$ and $r_{13}$, which will be elucidated later).

DESCRIPTION OF THE INVENTION

The invention envisages providing an NLO condensation polymer with low loss of signal and good polability.

The invention is characterised in that the NLO condensation polymer is a polycarbonate obtained from a monomer mixture comprising:
an NLO diol satisfying formula 1:

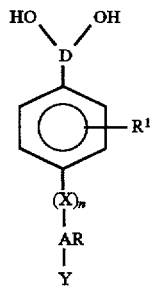

formula 1 wherein D is a trivalent donor group comprising 2–10 aliphatic, alicyclic, aromatic or heterocyclic carbon atoms, and comprising at least one alkoxy-oxygen atom, at least one sulphur atom, at least one selenium atom, or a nitrogen atom directly or conjugatedly bonded to the benzene ring, and wherein X stands for —$CR^2$=$CR^2$—, —N=N—, —$CR^2$=N— or —N=$CR^2$—, Y stands for —CN, —$NO_2$, $CR_2$=$C(CN)_2$, —$CF_3$, $SO_2R^4$, —C(CN)=$C(CN)_2$, barbiturate groups, or thiobarbiturate groups, AR stands for a six-membered aromatic ring, a six-membered aromatic ring substituted with one or more $R^3$ groups, a non-saturated 6 membered ring, a non-saturated six-membered ring substituted with one or more $R^3$ groups, a five-membered heteroatomic ring containing O, N, S, or Se, a five-membered heteroatomic ring substituted with one or more $R^3$ groups and containing O, N, S or Se, or a fused ring structure, $R^1$ stands for -halogen, —$R^2$, —$OR^2$, —$COR^2$, —CN or —$CF_3$ $R^2$ stands for -H, -halogen, an alkyl group having 1–6 carbon atoms, or a halo substituted alkyl group having 1–6 carbon atoms, $R^3$ stands for -halogen, —$R^2$, —$OR^2$, $COR^2$, —CN, $NO_2$, $SO_2R^4$ or $CF_3$, $R^4$ stands for an (halogenated) alkyl group having 1–4 carbon atoms, n is an integer from 0 to 4, with the X-groups being the same or different, and a compound according to formula 2:

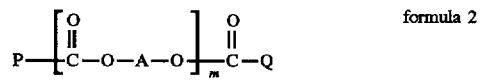

formula 2 wherein:

P stands for —Cl, O—R, an imidazole group or —O—Ph,

Q stands for —Cl, O—R, an imidazole group or —O—Ph,

R stands for an alkylene group having 1–6 carbon atoms,

Ph stands for phenyl,

A stands for —Ph—, halogenated —Ph—, —Ph—C$(CH_3)_2$—Ph—, halogenated —Ph—C$(CH_3)_2$—Ph—, —Ph—C$(CF_3)_2$—Ph—, halogenated —Ph—C$(CF_3)_2$—Ph—, —Ph—$SO_2$—Ph—, a cycloalkylene group having 3–24 carbon atoms, a halo substituted cycloalkylene group having 3–24 carbon atoms, an arylene group having 3–20 carbon atoms, or a naphthalene group, m is an integer from 0 to 5, with the A-groups being the same or different, with the proviso that the polycarbonate obtained from the polymerisation of bisphenol A bischloroformate and a compound according to the following formula:

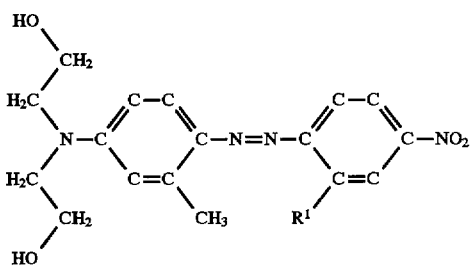

wherein R¹ is alkyl (C₁-C₆), alkoxy, —Cl, —Br, —ON, —NH₂, —NO₂, or —CN, are excluded.

It has been found that polycarbonates obtained from such a monomer mixture give active waveguides with low light loss in the waveband of 1300 to 1600 nm. This is the more remarkable given that the list of losses and the absorption spectra on pages 251 and 252 of *Angew. Makromol. Chem.*, 183, (1990) show that passive polycarbonate waveguides (i.e., without NLO groups) have a higher absorption in the wavelength range up to 1300 nm than, say, PMMA.

In EP-A2-0 194 747 a polycarbonate obtained from the polymerisation of bisphenol A bischloroformate and a compound according to the following formula is described:

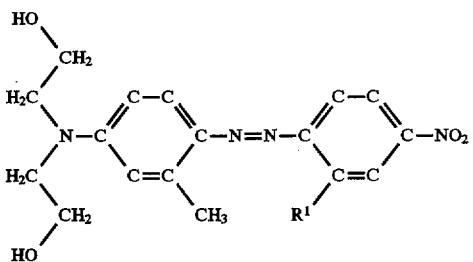

wherein R¹ is alkyl (C₁-C₆), alkoxy, —Cl, —Br, —OH, —NH₂, —NO₂, or —CN.

Said polycarbonate is used as a polymeric dye for optical storage media. Said polycarbonate is excluded from the present claims.

The polycarbonate according to the invention may be made into an optical waveguide component having a layered structure comprising the polycarbonate sandwiched between two deflection layers of lower refractive index than the polycarbonate layer. One of the methods of defining waveguide channels in the polycarbonate layer is by selectively changing the refractive index by irradiation. The refractive index change in most cases amounts to a decrease, and the irradiation process is referred to as a bleaching process. The polycarbonates according to the invention comprise NLO-groups which are both readily photobleachable and can be rendered NLO active by poling. The waveguide channels can be created by irrading the material surrounding the desired confined region. The polycarbonates according to the invention are suitable for use in active waveguide components, but also in passive waveguide components and thermooptic waveguide components.

As long as the donor group is an electron donating group, the nature of its bonding to the OH-groups are irrelevant as regards the NLO behaviour of the diol. The donor group is electron donating if it comprises at least one alkoxy-oxygen atom, one sulphur atom, one selenium atom, or a nitrogen atom directly or conjugatedly bonded to the benzene ring. The precise composition of the donor group may influence the NLO behaviour of the diol. Preferred donor groups which appeared to have a strong electron donating character are:

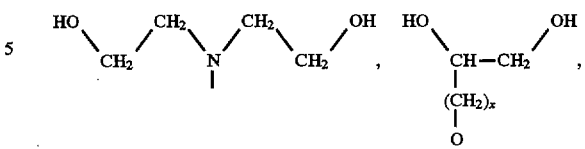

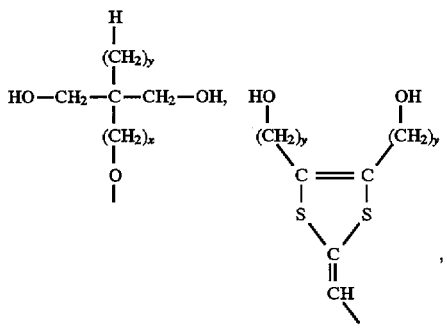

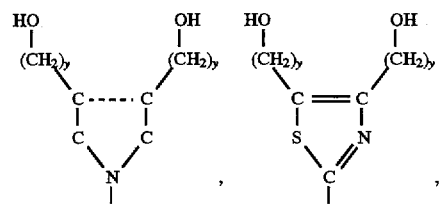

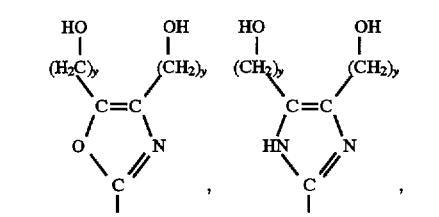

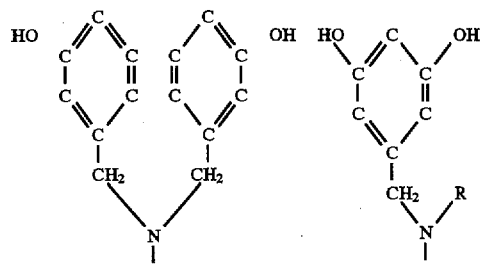

wherein OH stands for the OH-groups of formula 1, x and y stand for an integer 0–4, and R stands for —H or an alkyl having 1–6 carbon atoms.

The groups R¹ and R³ are not of vital importance to the NLO behaviour of the diol. Unless R³ takes the form of a very powerful electron withdrawing group, substituents at the aromatic ring will have little effect on the hyperpolarisability. In addition, when selecting substituents at the double bonds, care should be taken not to force the DπA system out of planarity too much.

Examples of AR groups are:

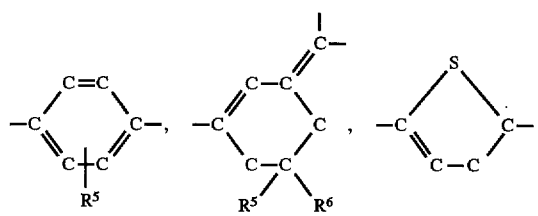

wherein $R^5$ and $R^6$ stands for —H or an alkyl group having 1–6 carbon atoms. When the methylene cyclohexene group is used, the exocyclic methylene may be part of a (thio) barbiturate ring.

The π-system of the following formula is preferred for its bleaching abilities:

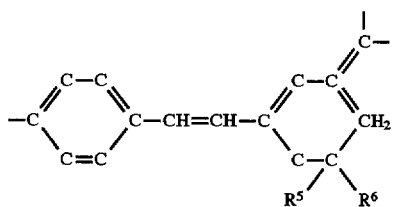

wherein $R^4$ and $R^6$ have the meaning given above.

The preferred donor groups are alkoxy and amino groups. The preferred acceptor groups are (thio)barbiturate, cyano and nitro groups, with thiobarbiturate and dicyano having the highest preference.

In the case of the compounds according to formula 2, the crux of the matter is that they have a proper leaving group adjacent to the carbonyl group. Since the compounds according to formula 2 must be divalent, they will always contain two leaving groups. If there is only one carbonyl group, the two leaving groups are both bonded to the same carbonyl group. This is found in the case of, e.g., phosgene or diphenyl carbonate. Suitable compounds according to formula 2 having more than one carboxyl group include bischloroformates of diols, such as described in *Encyclopedia of Chemical Technology* Vol. 18 (3rd ed.), pp. 491–492, and Wiley & Sons, *Encyclopedia of Polymer Science and Engineering* Vol 11, pp. 680–687, notably bisphenol A, hydroquinone, bisphenol S, and oligomers thereof. Preparation of the bischloroformates can be done by the base catalysed reaction of the diol in question with phosgene. Generally, the diols are dissolved in THF and phosgene is added slowly at 0° C., followed by the slow addition of the base. If the starting monomer used is diphenyl carbonate, the polycarbonate can be obtained by means of transesterification. In general, this requires the addition of another aromatic diol besides the diol according to formula 1, such as bisphenol A, carbonyl imidazole, or hexafluorobisphenol A. The same procedure applies when phosgene is used as the starting monomer.

The polycarbonates are obtained by reacting diols according to formula 1 in a basic solvent such as pyridine or THF containing a tertiary amine with an equivalent amount of compound according to formula 2. For setting the molecular weight a quantity of chain stopper may be added, e.g., phenol. For further details with regard to the preparation of polycarbonates reference may be had to *Comp. Pol. Sci.: The Synthesis, Characterization, Reactions and Applications of Polymers* Vol. 5 (Pergamon Press), Chapter 20, pp. 345–356.

Alternatively, of course, other, preferably aromatic or rigid, diols may be incorporated into the monomer mixture to enhance the polycarbonate's properties, such as Tg, mechanical strength, etc. For instance, use may be made of diols having a thermally or photochemically cross-linkable group, e.g., an allyl group, epoxy group, or isocyanate group. Alternatively, in addition to the diols according to formula 1 use may be made of compounds according to formula 2 containing a thermally or photochemically cross-linkable group, e.g., an allyl group, (meth)acrylate group, maleimide group, epoxy group, or isocyanate group. Further, in addition to the compounds according to formula 2 and the diols according to formula 1 there may be added to the monomer mixture compounds which will render the final polycarbonate cross-linkable. Examples of these include polyisocyanates and polyepoxides. It is preferred to use these cross-linkable polymers in waveguides made by spincoating various layers of polycarbonate one on top of the other. In consequence, the invention also pertains to cross-linkable and already cross-linked polycarbonates obtained from a monomer mixture comprising a diol according to formula 1 and a compound according to formula 2, with there being a cross-linkable group either in the monomer mixture as an additional compound, or in a compound according to formula 2.

A further relevant publication is EP-A2-0 403 132, which describes carbamate diols that may be polycondensed with diisocyanates, dioic acids, or bischloroformates to form polyurethanes, polyesters, and polycarbonates, respectively. Some of the carbamate diols mentioned have non-linear-optical properties, but their structure differs essentially from that of the diols according to formula 1. This publication does not disclose whether polycarbonates made from these carbamate diols have any advantages over the polyesters or polyurethanes of these diols.

Another relevant publication is U.S. Pat. No. 5,208,299 which refers to NLO polycarbonates having dihydroxy arylhydrazone NLO groups. Said dihydroxy aryl hydrazone NLO group which is incorporated into the backbone of the polymer, does not have a structure according to formula 1. It is not indicated whether the polycarbonates mentioned in U.S. Pat. No. 5,208,299 have a low loss of signal compared with other NLO polymers. Further, the polycarbonates mentioned in this patent publication are not (as readily) bleachable as the polycarbonates of the invention.

For completeness, reference is made to a number of other publications disclosing polymers containing non-linear optically active groups: JP 63 228 135, U.S. Pat. No 4,859,876, EP-A2 0 464 795, and EP-A1-0 493 716. While these publications focus essentially on non-linear optically active polyacrylates or polystyrenes, it is also mentioned that the non-linear active groups may be present in other polymers, including polycarbonates. However, none of the publications provides any further elucidation as to the manner in which these non-linear optically active polycarbonates might be obtained. Neither is it suggested in these publications that NLO polycarbonates based on diols according to formula 1 and compounds according to formula 2 have any properties rendering them more suitable for use in active waveguides than other polymers mentioned, for instance, a lower loss of signal and an improved polability.

Within this framework, particular preference is given to polycarbonates based on bischloroformates of hexafluorobisphenol A or hexafluorotetrabromobisphenol A and sulphonylbiphenol or deuterated bisphenol A or sulphonylbiphenol: they were found to give an exceptionally low loss of signal. Generally speaking, preference is given to polycarbonates which have had their non-aromatic C—H-groups replaced by C-halogen groups at least in part, since they absorb less light in the waveband of 1300–1600 nm. In addition, replacing aromatic C—H bonds with C-halogen bonds makes for an increase in Tg.

Besides the loss of signal, a key factor in determining the suitability of NLO material for use in active waveguides is thermal stability.

Poled films of the present, non-linear optically active polymers have excellent stability at room temperature. At elevated temperature, however, their stability is found wanting: relaxation causes the Pockels coefficients ($r_{13}$ and $r_{33}$, in this description the premise is that $r_{33}=3\times r_{13}$) to be reduced. The Pockels coefficient ($r_{33}$) serves as a measure of the non-linear optical behaviour of the film. The poor thermal stability of poled films made of already known non-linear optical polymers creates problems especially in the course of short-term heating to 200°–300° C. during soldering. Furthermore, the present non-linear optical polymers are unsuitable for use at more elevated service temperatures in the range of 60° to 120° C.

Especially preferred polycarbonates according to the invention are those where the diol according to formula 1 comprises a rigid donor group D.

When use is made of rigid donor groups, these are in fact built into the main chain, giving a rigid bond between the NLO group and the main chain. This results in a higher glass transition temperature (Tg above 170° C.) and hence in greater thermal stability.

Suitable as rigid donor groups are alicyclic groups containing nitrogen or sulphur. Examples of such donor groups are illustrated by formulae 3–7 below:

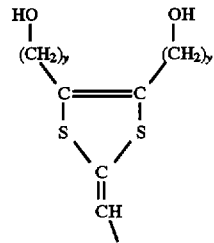

formula 3

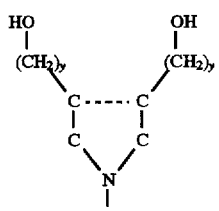

formula 4

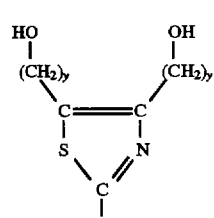

formula 5

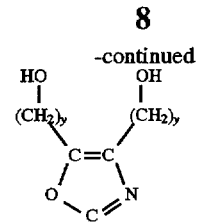

formula 6

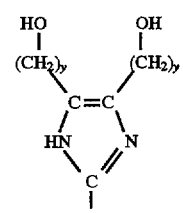

formula 7 wherein OH stands for the OH-groups of formula 1 and y stands for an integer 0–4.

Particularly suitable for obtaining non-linear optically active polycarbonates with low loss of light and good thermal stability were found to be pyrrolidine groups (according to formula 4) in which the nitrogen atom is directly bonded to the benzene ring of formula 1, and dithiafulvene groups (according to formula 3). For further information on these groups reference may be had in WO 94/01480.

For uses which do not require extremely high Tgs it is possible to employ polycarbonates based on diols having more flexible donor groups than the ones described above. This is often desired because polycarbonates having flexible donor groups tend to be more readily polable than polycarbonates having rigid donor groups. Examples of donor groups having more flexible donor groups, and thus are readily polable but still result in polycarbonates with high Tgs are given in formulae 8 and 9 below:

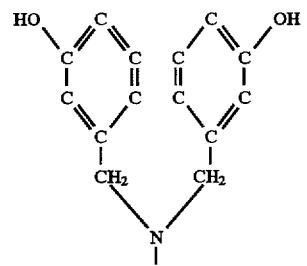

formula 8

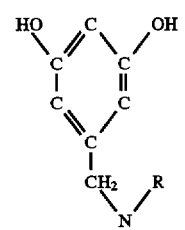

formula 9 wherein OH stands for the OH-groups of formula i and R stands for —H or an alkyl group having 1–6 carbon atoms.

After being dissolved in an appropriate solvent, the polycarbonates may be applied onto a substrate by means of spincoating. Suitable solvents are those which meet the following requirements: firstly, of course, the polycarbonate has to be soluble in the solvent. Further, the solvent should properly wet the substrate. The resulting polymer solution has to be filterable for efficient spincoating. As solvents which meet these requirements for silicon or glass substrates may be mentioned THF, o-xylene mesitylene, γ-butyro lactone, ethylene glycol diacetate , diglyme, cyclohexyl acetate, tetra chloorethane, cyclopentanone, 2-methyl cyclohexanon, 2-methoxy ethylacetate. After evaporation of the solvent the film thus formed may be poled, e.g., by means of the so-called DC-induced Pockels effect technique. This technique involves applying both a.c. and d.c. voltage to the sample. The d.c. voltage field orients the molecules and induces the Pockels effect, while the a.c. voltage field serves to measure the Pockels coefficient. The d.c. voltage field intensity is in the range of 10–30 V/µm.

In order to obtain films of sufficient thickness for use as waveguides it is often necessary to spincoat several layers one on top of the other. Further, a cladding layer has to be provided onto the NLO active layer. To prevent the subjacent layer from dissolving during the application of the next layer, use may be made of polycarbonates according to the invention which are cross-linkable. This will enable the polymer to be (partially) cross-linked during or after poling, so that the layer will no longer dissolve in the next one. A description of these cross-linkable polycarbonates can be found above. The invention further pertains to a non-linear optical waveguide comprising a non-linear optical polycarbonate according to the invention.

The invention will be further illustrated with reference to a number of unlimitative examples.

EXAMPLES

EXAMPLE 1

The Synthesis of Polycarbonate 1

To 7.17 g of 4-di(2-hydroxyethyl)amino-4'-nitrostilbene and 7.72 g of bisphenol A bischloroformate in 100 ml of THF there were added dropwise in one hour 3.46 g of pyridine. After one hour of stirring 1.73 g of pyridine were added, whereupon stirring was continued for two more hours. The reaction product was precipitated in methanol. M. W.: 11,500, Tg: 116°–122° C.

EXAMPLE 2

The Synthesis of Polycarbonate 2

To 3 g of hexafluorobisphenol A in 30 ml of THF there were added at a temperature of −10° C. to 0° C. 2.2 g of phosgene. In one hour 1.41 g of pyridine were added dropwise. After one hour of stirring at room temperature the excess phosgene was carried off with the aid of a nitrogen stream, after which the reaction mixture was heated to reflux temperature. Next, 2.93 g of 4-di(2-hydroxyethyl)amino-4'-nitrostilbene in 80 ml of THF were added dropwise to the reaction mixture in one hour. Subsequently, 1.41 g of pyridine were added dropwise in one hour. After two hours of stirring 0.70 g of pyridine was added, with stirring being continued for a further hour. The reaction product was precipitated in methanol. M. W.: 5700, Tg: 113°–122° C.

EXAMPLE 3

The Synthesis of Polycarbonate 3

To 7.5 g of tetrabromobisphenol A in 40 ml of THF there were added at a temperature of −10° C. to 0° C. 4.3 g of phosgene. In one hour 2.18 g of pyridine were added dropwise. After one hour of stirring at room temperature the excess phosgene was carried off with the aid of a nitrogen stream, after which the reaction mixture was heated to reflux temperature. Next, 4.40 g of 4-di(2-hydroxyethyl)amino-4'-nitrostilbene in 80 ml of THF were added dropwise to the reaction mixture in 30 minutes. Subsequently, 2.18 g of pyridine were added dropwise in one hour. After two hours of stirring 1.09 g of pyridine were added, with stirring being continued for a further two hours. The reaction product was precipitated in methanol. M. W.: 6100, Tg: 141°–149° C.

EXAMPLE 4

The Synthesis of Polycarbonate 4

To 1.55 g of 4-di(2-hydroxyethyl)amino-4'-nitrostilbene and 3.69 g of hexafluorotetrabromobisphenol A bischloroformate in 40 ml of THF there was added dropwise in one hour 0.75 g of pyridine. After two hours of stirring 0.38 g of pyridine was added and stirring was continued for a further two hours. The reaction product was precipitated in methanol. M. W.: 16,500, Tg: 157°–164° C.

EXAMPLE 5

The Synthesis of Polycarbonate 5

To 1.52 g of 4-di(3-hydroxybenzyl)amino-4'-nitrostilbene and 2.62 g of hexafluorotetrabromobisphenol A bischloroformate in 25 ml of THF there were added dropwise in one hour 0.53 g of pyridine. After two hours of stirring 0.26 g of pyridine was added, whereupon there was a further two hours of stirring. The reaction product was precipitated in methanol. M. W.: 11,500, Tg: 155°–161° C.

EXAMPLE 6

The Synthesis of Polycarbonate 6

To 10 g of phenolphthalein in 50 ml of THF there were added at a temperature of −10° C. to 0° C. 7.5 g of phosgene. In one hour 4.96 g of pyridine were added dropwise. After two hours of stirring at room temperature the excess phosgene was carried off with the aid of a nitrogen stream, after which the reaction mixture was heated to reflux temperature. Next, 10.3 g of 4-di(2-hydroxyethyl)amino-4'-nitrostilbene in 200 ml of THF were added dropwise to the reaction mixture in one hour. Subsequently, 4.96 g of pyridine were added dropwise in one hour. After two hours of stirring 2.48 g of pyridine were added, with stirring being continued for a further two hours. The reaction product was precipitated in methanol. M. W.: 6610, Tg: 151°–159° C.

EXAMPLE 7

The Synthesis of Polycarbonate 7

[3-[2-[4-[bis(2-hydroxyethyl)amino]phenyl]ethenyl]5,5-dimethyl-2-cyclohexene-1-ylidene]-propane dinitrile was prepared as was described in EP-0 363 237.

To 19.4 g of [3-[2-[4-[bis (2-hydroxyethyl) amino] phenyl]ethenyl]5,5-dimethyl-2-cyclohexene-1-ylidene]-propane dinitrile and 40.0 g of hexafluorotetrabromobisphenol A bischloroformate in 400 ml of THF (tetrahydrofuran) there was added dropwise in one hour 8.3 ml of pyridine, at 0° C. The reaction mixture was allowed to heat up to 20° C. After 18 hours of stirring, the reaction product was precipitated in methanol. M. W.: 23,000, Tg was measured to be 167°–175° C.

Films of polycarbonate 7 appeared to be readily photobleachable through irradiation with light of a wavelength of 420 (±20) nm and an intensity of 15 mW/cm$^2$.

EXAMPLE 8

The Synthesis of Polycarbonate 8

Synthesis of [3-[2-[4-[bis(2-hydroxyethyl)amino]phenyl] ethenyl]5,5-dimethyl-2-cyclohexene-1-ylidene]-N,N'diethylthiobarbiturate 1,3-Diethyl-4,6-dioxo-2-thiono-5-(1,5,5-trimethylcyclohexene-3-ylidene)-hexahydropyrimidine (64.00 g), 4-(diethanolamino)benzaldehyde (41.80 g), and β-alanine (1.40 g) in 250 ml of dimethylformamide were heated at 90° C. for 1.5 h. After cooling, the reaction mixture was poured into 2000 ml of water and the solid was filtered off. Recrystallization of the residue from ethanol (550 ml) gave the title compound (79.90 g).

To 3.24 g of [3-[2-[4-[bis (2-hydroxyethyl) amino] phenyl]ethenyl]5,5-dimethyl-2-cyclohexene-1-ylidene]-N, N'diethylthiobarbiturate and 2.93 g of hexafluorobisphenol A bischloroformate in 100 ml of THF (tetrahydrofuran) there was added dropwise in one hour 1.02 ml of pyridine, at 0° C. The reaction mixture was allowed to heat up to 20° C. After 18 hours of stirring, the reaction product was precipitated in methanol. M. W.: 9900, the Tg was measured to be.142°–148° C.

EXAMPLE 9

The Synthesis of Polycarbonate 9

Synthesis of 4-dietehanolaminostilbene-4'dicyanovinylidene

4-Diethanolamino-4'-(1,3-dioxolanyl-(2))-stilbene

Triphenyl-[4-(1,3-dioxolanyl-(2))-benzyl]-phosphonium chloride (10.0 g) and 4-diethanolaminobenzaldehyde (5.0 g) were dissolved in 10 ml of absolute methanol. Lithium methoxide solution (prepared by dissolving 220 mg lithium in 6 ml of methanol) was added and the resulting solution stirred overnight. The solid was filtered off and washed with methanol and dried in vacuo. Yield 3.11 g of title compound.

4-Diethanolaminostilbene-4'-carboxaldehyde

4-Diethanolamino-4'-(1,3-dioxolanyl-(2))-stilbene (3.91 g) was dissolved in 25 ml of 2M hydrochloric acid and stirred for 30 min. Ammonium hydroxide was added dropwise until the solution became basic. The crystalline solid was filtered off, washed with water and dried. Yield 2.87 g of product.

4-Diethanolaminostilbene-4'-dicyanovinylidene

4-Diethanolaminostilbene-4'-carboxaldehyde (2.87 g) and malonitrile (1.10 g) were dissolved in 25 ml of methanol. 50 μl of piperidine was added and the mixture was refluxed for 6 h. After cooling, the product was filtered off and recrystallized from absolute ethanol. Yield 2.59 g).

To 2.28 g of 4-diethanolaminostilbene-4'-dicyanovinylidene and 2.93 g of hexafluorobisphenol A bischloroformate in 60 ml of THF (tetrahydrofuran) there was added dropwise in one hour 1.02 ml of pyridine, at 0° C. The reaction mixture was allowed to heat up to 20° C. After 18 hours of stirring, the reaction product was precipitated in methanol. M. W.: 15,000, Tg was measured to be 128°–133° C.

EXAMPLE 10

The Synthesis of Polycarbonate 10

To 1.97 g of [3-[2-[4-[bis (2-hydroxyethyl) amino] phenyl]ethenyl]5,5-dimethyl-2-cyclohexene-1-ylidene]-N, N'diethylthiobarbiturate and 3.02 g of hexafluorotetrabromobisphenol A bischloroformate in 60 ml of THF (tetrahydrofuran) there was added dropwise in one hour 0.63 ml of pyridine, at 0° C. The reaction mixture was allowed to heat up to 20° C. After 18 hours of stirring, the reaction product was precipitated in methanol. M. W.: 10,700, the Tg was measured to be 159°–168° C.

EXAMPLE 11

The Synthesis of Polycarbonate 11

Synthesis of N,N'diethanolaminobenzene-4 ethenyl-2 thiophene 4 di(acetylethanyl)aminobenzaldehyde (35.0 g) and diethyl thiophene-3 methylene-phosphonate (35.0 g) was dissolved in 250 ml of anhydrous tetrahydrofuran. Sodium hydride (7.5 g) was added portionswise and the mixture was stirred overnight at room temperature. Methanol (100 ml) was added and the mixture was stirred for i h. After the addition of water (500 ml), the aqueous layer extracted with diethyl ether (3×200 ml).

The combined organic layers were dried over $MgSO_4$ and the solvent removed under reduced pressure. The residue was recrystallized from chloroform. Yield of 18.8 g of diethanolaminobenzene-thiophene.

To 1.50 g of N,N'diethanolaminobenzene-4 ethenyl-2 thiophene and 4.06 g of hexafluorotetrabromobisphenol A bischloroformate in 20 ml of THF (tetrahydrofuran) there was added dropwise in one hour 0.84 ml of pyridine, at 0° C. The reaction mixture was allowed to heat up to 20° C. After 18 hours of stirring, the reaction product was precipitated in methanol.

3.5 g of the polycarbonate obtained was reacted with 0.55 g tetracyanaoethene in 15 ml DMF for 5½ hours at a temperature of 90 ° C. The reaction product was precipitated in methanol. M. W.: 80900, the Tg was measured to be 177°–186° C.

Polycarbonates 1–4 were spincoated onto a Si-wafer. The light losses of these polycarbonate films were measured by coupling white light into the film with a prism and coupling the light out with a second prism. The outgoing light had its absorbtion spectrum recorded. By varying the distance between the two prisms different interaction lengths were obtained, and the loss per cm was calculated.

This measuring procedure has been described in Hoekstra et al., *Optics Letters* Vol. 17 (1992), pp. 1506–1508. Polycarbonate prepared from bisphenol A produced a light loss of 0.5 dB/cm at 1305 nm, and i dB/cm at 1565 nm. By replacing the H-atoms in the methyl groups with F-atoms, as in the case of hexafluorobisphenol A, the light loss in the 1300–1600 nm range is reduced: the absorption at 1305 nm is 0.2 dB/cm, while at 1565 nm it is less than 0.4 dB/cm. Substituting F-atoms for the aromatic H-atoms, as in tetrabromobisphenol A, gives a reduction of the light loss in the 1400–1500 nm range. The light loss at 1565 nm is reduced to 0.8 dB/cm. The polymer obtained from the reaction of hexafluorotetrabromobisphenol A combines the two advantages with respect to loss of light (0.2 dB/cm at 1305 nm and 0.2 dB/cm at 1565 nm. The light loss of polycarbonate 9 appeared to be 0.1–0.2 dB/cm at 1302 nm and 0.3–0.7 dB/cm at 1565 nm.

EXAMPLE 12

Crosslinking with Epoxy 2 g polycarbonate 1, 0.2 g araldite MY 721®, ex Ciba Geigy and 0.02 g tripropylamine were dispersed in 5 g cyclopentanone. The mixture was spincoated on a Si-wafer and after poling the film was cured for 2 hours at a temperature of 160 ° C. The resulting film appeared to be insoluble in cyclopentanone. The Tg was measured to be 85°–135 ° C. At 1305 nm the light loss was 0.25 dB/cm and at 1565 nm the light loss was 0.37 dB/cm.

EXAMPLE 13

Polycarbonate 12 Crosslinked with Polyisocyanates

To 11.37 g of 4-di(2-hydroxyethyl)amino-4'-nitrostilbene and 13.7 g of hexafluorobisphenol A bischloroformate in 200 ml of THF there were added dropwise in one hour 4.78 g of pyridine. The reaction mixture was allowed to heat up to 20° C. After 18 hours of stirring, the reaction product was precipitated in water. M. W.: 5200, The OH number was 0.72 meq/g.

5.0 g of the prepolymer was mixed with 0.78 g Desmodur N 3390®, ex Bayer, in 10 g cyclopentanon. The mixture was spincoated on a Si-wafer and after poling the film was cured for 2 hours at a temperature of 140 °C. The resulting film appeared o be insoluble in cyclopentanone. The Tg measured to be 121°–125 °C.

We claim:

1. A non-linear optically active side chain condensation polymer, characterised in that the polymer is a polycarbonate obtained from a monomer mixture comprising:

an NLO diol satisfying formula 1:

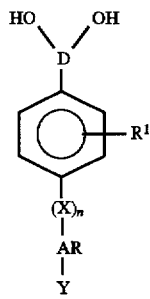

formula 1 wherein D is a trivalent donor group comprising 2–10 aliphatic, alicyclic, aromatic or heterocyclic carbon atoms, and comprising at least one alkoxy—oxygen atom, at least one sulphur atom, at least one selenium atom, or a nitrogen atom directly or conjugatedly bonded to the benzene ring, and wherein X stands for —$CR^2$=$CR^2$—, —N=N—, —$CR^2$=N— or —N=$CR^2$—, Y stands for —CN, —$NO_2$, $CR^2$=$C(CN)_2$, —$CF_3$, $SO_2R^4$, —C(CN)=$C(CN)_2$, barbiturate groups, or thiobarbiturate groups, AR stands for a six-membered aromatic ring, a six-membered aromatic ring substituted with one or more $R^3$ groups, a non-saturated 6 membered ring, a non-saturated six-membered ring substituted with one or more $R^3$ groups, a five-membered heteroatomic ring containing O, N, S, or Se, a five-membered heteroatomic ring substituted with one or more $R^3$ groups and containing O, N, S or Se, or a fused ring structure, $R^1$ stands for -halogen, —$R^2$, —$OR^2$, —$COR^2$, —CN or —$CF_3$ $R^2$ stands for —H, -halogen, an alkyl group having 1–6 carbon atoms, or a halo substituted alkyl group having 1–6 carbon atoms, $R^3$ stands for -halogen, —$R^2$, —$OR^2$, $COR^2$, —CN, $NO_2$, $SO_2R^4$ or $CF_3$, $R^4$ stands for an (halogenated) alkyl group having 1–4 carbon atoms, n is an integer from 0 to 4, with the X-groups being the same or different, and a compound according to formula 2:

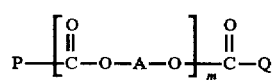

formula 2 wherein:

P stands for —Cl, O—R, an imidazole group or —O—Ph,

Q stands for —Cl, O—R, an imidazole group or —O—Ph,

R stands for an alkylene group having 1–6 carbon atoms,

Ph stands for phenyl,

A stands for —Ph—, halogenated —Ph—, —Ph—$C(CH_3)_2$—Ph—, —Ph—$SO_2$—Ph—, a cycloalkylene group having 3–24 carbon atoms, a halo substituted cycloalkylene group having 3–24 carbon atoms, an arylene group having 3–20 carbon atoms, or a naphthalene group, m is an integer from 0 to 5, with the A-groups being the same or different, with the proviso that the polycarbonate obtained from the polymerisation of bisphenol A bischloroformate and a compound according to the following formula:

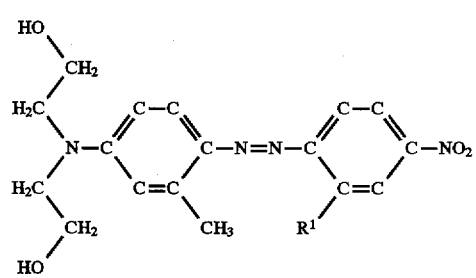

wherein $R^1$ is alkyl ($C_1$–$C_6$), alkoxy, —Cl, —Br, —OH, —$NH_2$, —$NO_2$, or —CN, are excluded.

2. A non-linear optically active side chain condensation polymer according to claim 1, characterised in that D is a group selected from the following formulae:

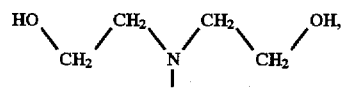

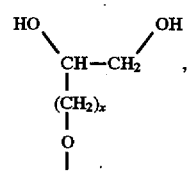

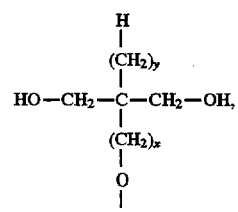

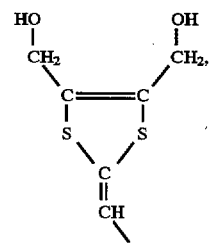

-continued

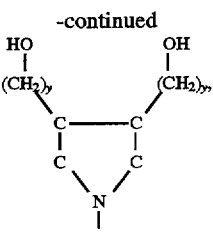

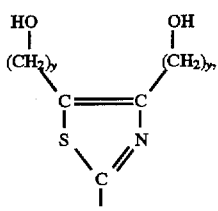

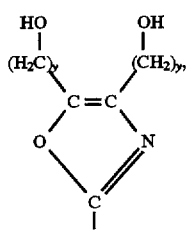

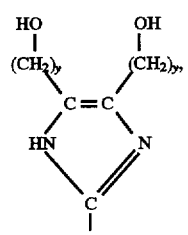

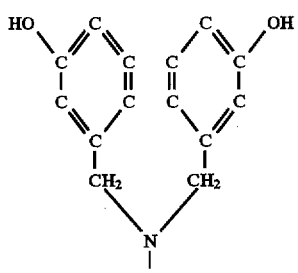

-continued

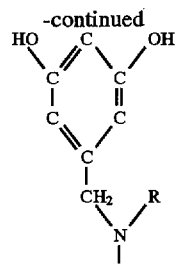

wherein OH stands for the OH-groups of formula 1, x and y stand for an integer 0–4, and R stands for —H or an alkyl having 1–6 carbon atoms.

3. A non-linear optically active side chain condensation polymer according to claim 1 or 2, characterised in that the monomer mixture comprises a bischloroformate of sulphonylbiphenol or hexafluorobisphenol A.

4. A non-linear optically active side chain condensation polymer according to claim 1 or 2, characterised in that the monomer mixture comprises a bischloroformate of hexafluorotetrabromobisphenol A.

5. A non-linear optically active side chain condensation polymer according to claim 1, characterised in that the diol has a π system according to the following formula:

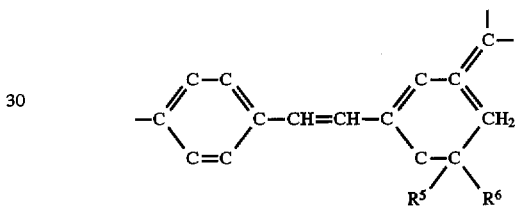

wherein $R^5$ and $R^6$ stands for —H or an alkyl group having 1–6 carbon atoms.

6. A non-linear optically active side chain condensation polymer according to claim 1 or 2, characterised in that D comprises a rigid donor group.

7. A non-linear optically active side chain condensation polymer according to claim 5, characterised in that D is a dihydroxypyrrolidine group or a dihydroxydithiafulvene group.

8. A non-linear optically active side chain condensation polymer according to claim 6, characterised in that D is a dihydroxypyrrolidine group or a dihydroxydithiafulvene group.

9. A non-linear optically active side-chain condensation polymer according to claim 1, characterised in that the polymer is cross-linked.

10. A non-linear optically active side-chain condensation polymer according to claim 1, characterised in that the polymer is cross-linkable.

* * * * *